T. DOWLING.
Cylindrical Couplings for Shafting, &c.

No. 198,508. Patented Dec. 25, 1877.

Witnesses:
E. A. Phelps.
C. G. Keyes.

Inventor:
Thomas Dowling,
by his attorney

UNITED STATES PATENT OFFICE.

THOMAS DOWLING, OF GLOUCESTER, MASSACHUSETTS.

IMPROVEMENT IN CYLINDRICAL COUPLINGS FOR SHAFTING, &c.

Specification forming part of Letters Patent No. 198,508, dated December 25, 1877; application filed September 14, 1877.

*To all whom it may concern:*

Be it known that I, THOMAS DOWLING, of Gloucester, Essex county, Massachusetts, have invented an Improvement in Cylindrical Couplings; and that the same is fully described in the annexed specification and illustrated in the accompanying drawing.

My improvement is applicable to a great variety of uses, being adapted generally to the coupling of cylindrical bodies, such as shafting, pump-barrels, and their bases, &c.

My invention consists in two cylinders, or a tube and suitable base, provided at or near their ends with enlarged collars or projections, in combination with eccentrically-headed bolts and tightening-nuts, adapted to clamp the two cylinders to each other by means of their projecting collars, as hereinafter more fully set forth.

Figure 1:
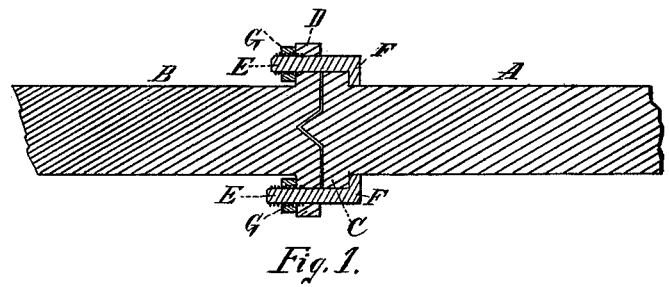
Figure 2:
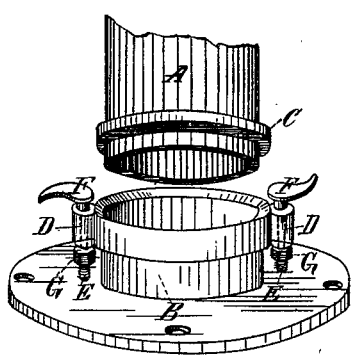

The drawing illustrates the practical application of my invention, Figure 1 showing a longitudinal section of a shaft-coupling; Fig. 2, a perspective of a pump-barrel removed from its base; and Fig. 3, a plan of the same, the parts clamped to each other.

A and B are the two cylinders to be coupled together, or the pump-barrel and base, respectively. The base or cylinder B is provided with a broad collar, or with suitable projections D D, through which the bolts E pass, and against the ends or under side of which the nuts G bear.

C is a collar upon the barrel or cylinder A, but is of less diameter than the corresponding enlargement D, formed on the part B, so that the bolts E, which pass through the projections D, shall not penetrate the collar C, but pass just outside thereof.

Figure 3:
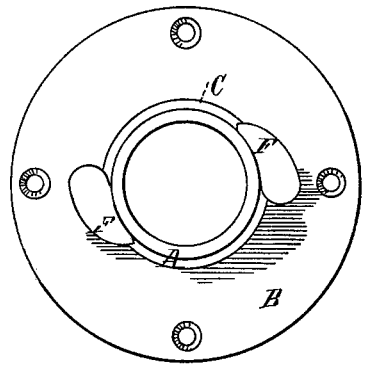

The heads F of the bolts are eccentric—that is, they are placed so as to project considerably on one side of the bolts and none on the other; and I prefer to give them the crescent or wing shape shown in Figs. 2 and 3, so as to fit more closely to the tube A and upon its collar or flange C. As a result of this eccentric position of the bolt-heads, it is obvious that when turned as in Figs. 1 and 3, they will rest upon or embrace the collar C, and, with the bolts and nuts, serve to couple the parts A and B together, while, by loosening the nuts G and turning the bolts so that their eccentric-heads shall project outwardly, as in Fig. 2, the two cylinders may be readily disconnected without removing the bolts from their sockets in the part D.

It is important, in order to prevent lateral displacement, that the parts to be coupled shall interlock somewhat, or penetrate the one within the other longitudinally. This feature is represented in the drawings, Fig. 1 showing the shaft B countersunk or recessed centrally, and the shaft A projecting correspondingly within the recess, while in Fig. 2 the base B has a socket, beveled along its upper edge, to receive the end of the barrel A, prolonged beyond the collar C.

I claim as my invention—

The improvement in cylindrical couplings herein described, consisting of the parts A B, provided with collars or projections C D, in combination with the eccentric-headed bolts E F and nuts G, constructed and adapted to operate substantially as set forth.

THOMAS DOWLING.

Witnesses:
 WALTER E. MAYO,
 CHARLES H. OXTON.